United States Patent

[11] 3,548,869

| [72] | Inventors | Irvin B. Weise<br>Bellaire;<br>William L. Anderson Jr., Houston, Tex. |
|---|---|---|
| [21] | Appl. No. | 709,997 |
| [22] | Filed | Mar. 4, 1968 |
| [45] | Patented | Dec. 22, 1970 |
| [73] | Assignee | Anderson Greenwood & Co.<br>Houston, Tex.<br>a corporation of Texas |

[54] SOFT SEATED VALVE
9 Claims, 3 Drawing Figs.

[52] U.S. Cl........................................137/516.29,
 137/516.25, 137/516.27; 251/332, 251/333
[51] Int. Cl................................................ F16k 15/04
[50] Field of Search............................................137/516.25,
 516.27, 516.29; 251/332, 333, 122

[56] References Cited
UNITED STATES PATENTS

| 2,929,401 | 3/1960 | Cowan.......................... | 251/332 |
| 2,940,472 | 6/1960 | Chilcoat....................... | 251/332 |
| 3,054,594 | 9/1962 | Hecht............................ | 251/333 |
| 3,228,655 | 1/1966 | Weise........................... | 251/122 |

Primary Examiner—William F. O'Dea
Assistant Examiner—William H. Wright
Attorneys—J. Vincent Martin, Joe E. Edwards and Jack R. Springgate ABSTRACT: The drawings and the description of the structure illustrated in the drawings disclose a preferred form of valve having a body which defines an inlet, an outlet and a valve seat surrounding the communication from the inlet to the outlet, a resilient seat ring positioned in the body so that a valve member upon closing engages the resilient seat ring and thereafter engages the valve seat to provide a metal-to-metal seating. This abstract is neither intended to define the invention of the application which, of course, is measured by the claims, nor is it intended to be limiting as to the scope of the invention in any way.

PATENTED DEC 22 1970
3,548,869
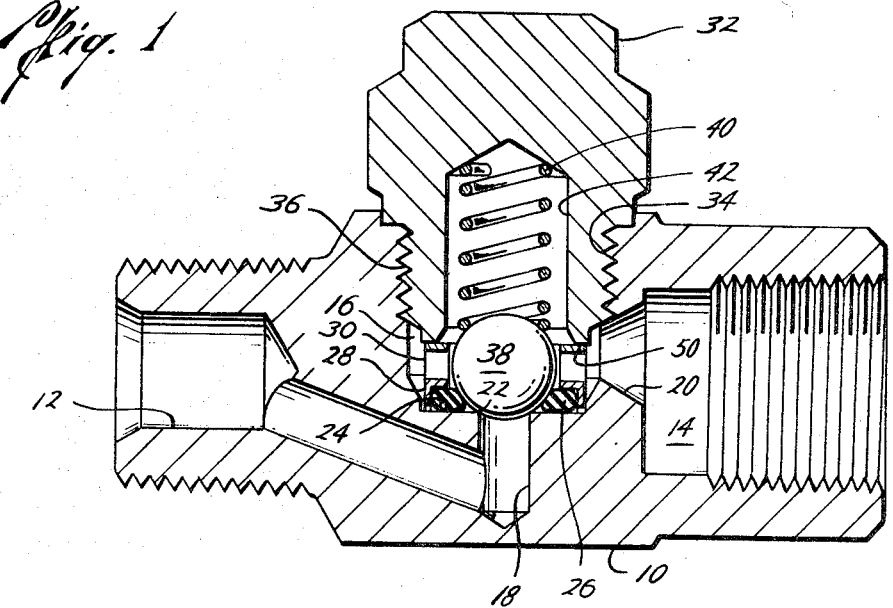
Fig. 1
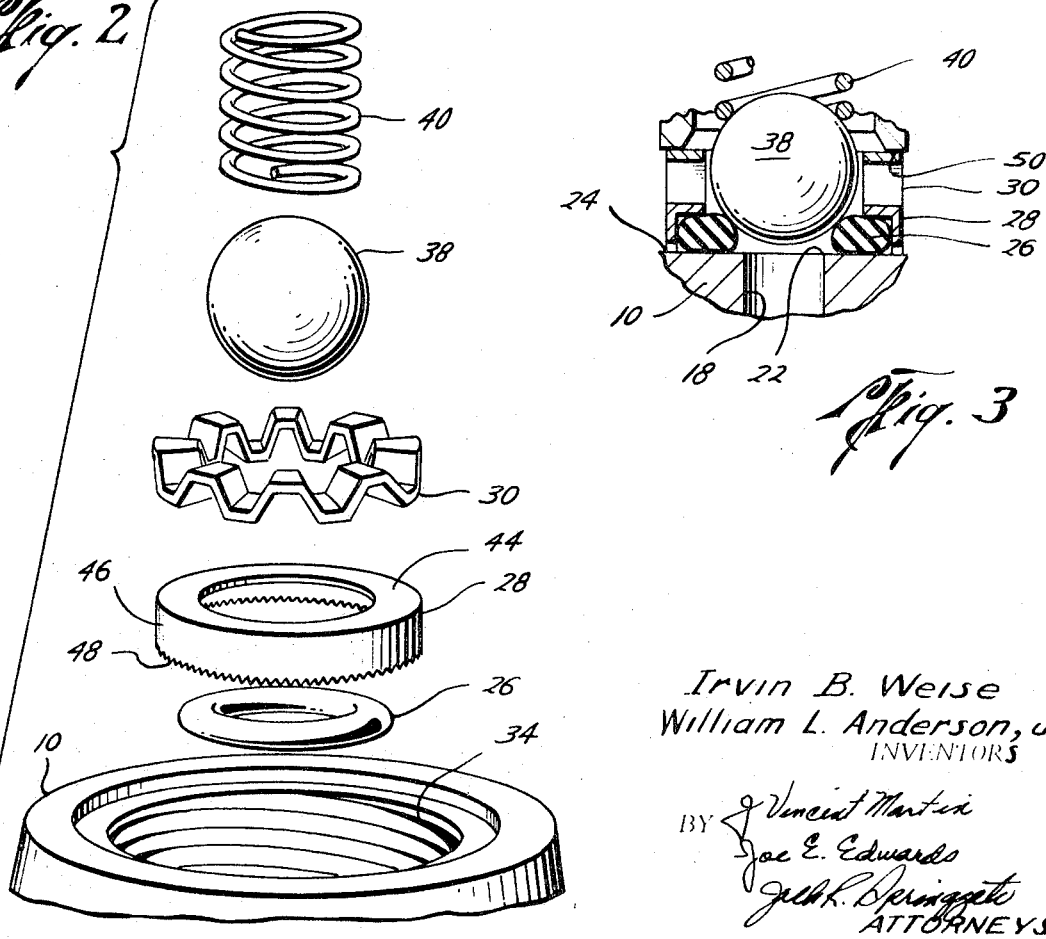
Fig. 2
Fig. 3
Irvin B. Weise
William L. Anderson, Jr.
INVENTORS
BY Vincent Martin
Joe E. Edwards
Jack R. Springate
ATTORNEYS

SOFT SEATED VALVE

BACKGROUND OF THE INVENTION

In valves it is often desirable to provide a relatively soft seat for the valve member to engage to assure that the valve member seats under light seating forces to seal off flow. In such devices considerably difficulty has been encountered resulting from extrusion of the soft seat when exposed to back pressure and also in blowing out of the soft seat under high velocity flow conditions.

SUMMARY

The present invention relates generally to improved soft seated valves which are particularly suitable for use as check valves.

It is an object of the present invention to provide an improved soft-seated valve in which the soft seat is protected from extrusion when subjected to back pressures.

Another object is to provide an improved soft seated valve in which the soft seat does not blow out when subjected to high velocity flows.

A further object is to provide an improved soft-seated valve in which the soft seat is retained therein without unduly restricting flow through the valve.

Still another object is to provide an improved ball check valve having initial soft seating and a subsequent metal-to-metal seating without excessive restriction to flow therethrough.

A still further object is to provide an improved soft seated check valve in which the soft seat is protected from extrusion due to back pressures and from blow out due to high velocity fluid flow through the valve.

BRIEF DESCRIPTION OF THE DRAWINGS

These and other objects and advantages of the improved valve of the present invention are hereinafter described and explained with reference to the drawings wherein:

FIG. 1 is a cross-sectional view of a check valve embodying the novel features of the present invention and illustrating the metal-to-metal seating position of the valve member.

FIG. 2 is an exploded view of the components of the check valve shown in FIG. 1 with the bonnet omitted therefrom and only a portion of the body being shown.

FIG. 3 is a partial sectional view illustrating the soft seating position of the check valve shown in FIG. 1.

DESCRIPTION OF THE PREFERRED EMBODIMENT

The drawings illustrate a check valve in which the novel features of the present invention are incorporated. It is contemplated, however, that other types of valve structures may incorporate such features provided that such valve structures are not subjected to a reversal of flow therethrough. A typical example of a valve structure other than a check valve which might incorporate the feature of the present invention is a water faucet.

The check valve illustrated in the drawings includes the body 10 which defines the inlet 12, the outlet 14 and the chamber 16. The body 10 defines the passage 18 communicating between inlet 12 and chamber 16 and the passage 20 communicating between chamber 16 and outlet 14. The seat 22 surrounds the entry of the passage 18 into chamber 16 and the surface 24 extends radially outwardly from seat 22 to define the inner end of chamber 16.

The soft seat assembly including the seat ring 26, the annular retainer 28 and the annular corrugated flow washer 30, is positioned in chamber 16 as shown and is retained in such position by bonnet 32. The body 10 defines the threads 34 surrounding the outer portion of chamber 16 into which the internal threads 36 of bonnet 32 engage.

The valve member (ball 38) is positioned in chamber 16 and has a means for urging ball 38 toward seating engagement with seat ring 26 and seat 22. Such urging means includes the spring 40, one end of which engages ball 38 and the other end of which is supported in the recess 42 defined in bonnet 32. As shown both washer 30 and retainer 28 have an inner diameter larger than the diameter of ball 38 to allow the ball 38 to move freely into and from engagement with seat ring 26 and seat 22.

The retainer 28 has a flat annular portion 44 and a skirt 46 depending from the outer periphery of said flat portion 44. The edge of skirt 46 defines the radially extending serrations 48. When installed in chamber 16, seat ring 26 is positioned on surface 24 and retainer 28 is positioned with its skirt 46 surrounding seat ring 26 and its flat portion 44 confining a portion of seat ring 26 as shown in FIG. 1. Flow washer 30 is positioned on the flat portion 44 of retainer 28 and is forced downwardly thereon by the annular extension 50 of bonnet 32 when bonnet 32 is threaded into chamber 16. This tightening of bonnet 32 moves flow washer 30 and retainer 28 inwardly, compressing seat ring 26, forcing the serrations 48 of skirt 46 into engagement with surface 24. The serrations 48 provide communication through skirt 46 for the purpose hereinafter explained. The slight compression of seat ring 26 facilitates the soft seating of ball 38 thereon as illustrated in FIG. 3.

In operation, flow which is desired to pass through the check valve shown in conducted through inlet 12 and passage 18 and forces ball 38 out of seating engagement with seat 22 and seat ring 26. Spring 40 is normally adapted to exert a light pressure on ball 38 which is readily overcome by the flow pressure of fluids flowing through the check valve. When ball 38 is unseated flow is conducted around ball 38 through the spaced defined by flow washer 30 and the passage 20 to the outlet 14. Whenever flow in this direction ceases, the force of spring 40 returns ball 38 into seated engagement with seat ring 26. If considerable back pressure is developed this pressure forces ball 38 into seating engagement with seat 22. Since the inner diameter of seat ring 26 is larger than the diameter of seat 22, seat ring 26 is not pinched between ball 38 and seat 22. The metal-to-metal seating provided by seat 22 prevents the pressure extrusion of seat ring 26 when excessive back pressures are developed. This metal-to-metal seating assures that there can be no reverse flow through the check valve and provides a backup support for seat ring 26 to assure that it is not damaged by excessive back pressures.

Seat 22 is shown to be a sharp corner in the body 10. With the structure, ball 38 is preferred to be harder than the material of body 10 so that ball 38 is not deformed on seating. If desired seat 22 can be formed to have a bevel or concave annular area to receive ball 38 to assure that the seating of ball 38 on seat 22 does not create indentations on the surface of ball 38.

Seat ring 26 is a resilient annular ring having a circular cross section in its unloaded condition. Seat ring 26 may be an O-ring provided it is the proper size and has the desired degree of resiliency.

As previously mentioned, prior soft seats have been subject to blowing out responsive to high flow velocities. It is believed that the cause of such blowouts is that pressure tends to bleed behind the seal ring forcing it inward into the flow stream. By providing communication through the skirt 46 of retainer 28 any pressure bleeding past the seat ring 26 is not trapped between the retainer 28 and the seat ring 26 but is conducted into the chamber 16. The preferred form of such communication through skirt 46 is the serrations 48. However, if desired, such communication could be provided by a series of small holes extending through skirt 46.

This communication through skirt 46 does allow back pressure to be exerted against seat ring 26. As previously explained, the pressure exerted against seat ring 26 in this manner will not damage seat ring 26 since the ball 38 is moved into its seated position on seat 22 before a pressure sufficient to damage seat ring 26 can build up and thereafter ball 38 provides an internal support for seat ring 26 against such pressure.

The corrugated flow washer 30 is provided to hold the retainer 28 in position by transmitting the force exerted by the projection 50 of bonnet 32 to the retainer while providing the flow passages between the interior and exterior of the flow washer. As explained in the Irvin B. Weise U.S. Pat. No. 3,228,655 issued Jan. 11, 1966, this flow washer 30 may have sufficient resiliency to compensate for the varying distances between the end of bonnet 32 and the retainer 28 and thereby eliminate the necessity for close manufacturing tolerances.

From the foregoing it can be seen that the present invention provides an improved soft-seated valve, particularly applicable to check valves, having initial soft seating and subsequent metal-to-metal seating in which the resilient seat ring is protected against both blow out and extrusion and is held in position without unduly obstructing flow through the valve.

The foregoing disclosure and description of the invention are illustrative and explanatory thereof, and various changes in the size, shape and materials, as well as in the details of the illustrated construction, may be made within the scope of the appended claims without departing from the spirit of the invention.

We claim:

1. A check valve comprising:
   a body defining an inlet, an outlet, a communication between said inlet and said outlet, and a valve seat surrounding said communication;
   a resilient seat ring having an inner diameter larger than the diameter of said seat;
   an annular parted retainer having a flat radially extending annular portion and a skirt depending from the outer periphery;
   a valve member movable to and from seating engagement with said seat ring and said seat;
   said annular retainer engaging said seat ring to partially compress it in an axial direction;
   said annular retainer having an inner diameter larger than the diameter of said valve member; and
   said retainer positioning said seat ring concentrically around the downstream side of said valve seat and so that upon closing, said valve member initially engages said seat ring and thereafter engages said seat inwardly of said seat ring to confine said seat ring and prevent extrusion of said seat ring.

2. A valve according to claim 1 wherein said retainer defines a plurality of passages therethrough to equalize pressure across said seat ring.

3. A valve according to claim 1 including:
   an annular corrugated flow washer positioned within said body in engagement with said retainer; and
   means retaining said washer in engagement with said retainer whereby said washer holds said retainer in position within said body.

4. A valve according to claim 3 including a bonnet secured to said body and engaging said washer to provide said means retaining said washer in engagement with said retainer.

5. A valve comprising:
   a body defining an inlet, an outlet, a communication between said inlet and said outlet, and a valve seat surrounding said communication;
   a resilient seat ring having an inner diameter larger than the diameter of said seat;
   a retainer positioning said seat ring concentrically around the downstream side of said valve seat;
   said retainer having an annular flat portion with a skirt depending from the outer edge thereof;
   said seat ring being positioned between a surface on said body surrounding said seat and said annular flat portion of said retainer and within the skirt on said retainer;
   the edge of said retainer skirt being serrated to provide communication between the interior and exterior of said skirt;
   a valve member movable to and from seating engagement with said seat ring and said seat; and
   said seat ring being positioned with respect to said seat so that upon closing, said valve member initially engages said seat ring and thereafter engages said seat inwardly of said seat ring to confine said seat ring and prevent extrusion of said seat ring.

6. A valve according to claim 5, including a spring urging said valve member toward said seat ring and said seat.

7. A check valve comprising:
   a body defining an inlet, an outlet, a communication between said inlet and said outlet, and a valve seat surrounding said communication;
   a resilient seat ring having an inner diameter larger than the diameter of said seat;
   an annular parted retainer positioning said ring concentrically around the downstream side of said valve seat and having a flat radially extending annular portion and a skirt depending from the outer periphery thereof;
   said annular retainer engaging said seat ring to partially compress it in an axial direction;
   a ball;
   means urging said ball toward said seat ring and said seat;
   said seat ring being positioned with respect to said seat so that upon closing, said ball initially engages said seat ring and thereafter engages said seat inwardly of said seat ring to confine said seat ring and prevent extrusion of said seat ring; and
   said annular retainer having an inner diameter larger than the diameter of said ball.

8. A check valve according to claim 7 wherein the edge of said retainer skirt is serrated to provide communication between the interior and exterior of said skirt.

9. A check valve according to claim 7 including:
   an annular corrugated flow washer positioned within said body in engagement with said retainer; and
   means retaining said washer in engagement with said retainer whereby said washer holds said retainer in position within said body.